United States Patent
Tolhurst et al.

(10) Patent No.: US 11,448,350 B2
(45) Date of Patent: Sep. 20, 2022

(54) FLOW DIVIDER WITH INTERNAL VANE

(71) Applicant: Cummins Inc., Columbus, IN (US)

(72) Inventors: George Martin Tolhurst, Rugby (GB); Alan C. Anderson, Columbus, IN (US); John Robert Andras, Plain City, OH (US); Jonathan Bowen Wickliff, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 16/624,186

(22) PCT Filed: Jun. 25, 2018

(86) PCT No.: PCT/US2018/039285
§ 371 (c)(1),
(2) Date: Dec. 18, 2019

(87) PCT Pub. No.: WO2019/005670
PCT Pub. Date: Jan. 3, 2019

(65) Prior Publication Data
US 2020/0173593 A1 Jun. 4, 2020

Related U.S. Application Data

(60) Provisional application No. 62/527,385, filed on Jun. 30, 2017.

(51) Int. Cl.
*F16L 41/02* (2006.01)
*F15D 1/04* (2006.01)
*F15D 1/14* (2006.01)
*F28D 3/04* (2006.01)
(Continued)

(52) U.S. Cl.
CPC .......... *F16L 41/023* (2013.01); *B01J 8/0278* (2013.01); *B01J 8/0492* (2013.01); *B01J 8/22* (2013.01);
(Continued)

(58) Field of Classification Search
CPC .......... F16L 41/023; F15D 1/04; F17D 1/005; F28F 9/0275; F28D 3/04; B01F 15/0266;
(Continued)

(56) References Cited

U.S. PATENT DOCUMENTS 3,597,166 A 8/1971 Hochman
4,414,100 A * 11/1983 Krug ...................... C10G 11/18
208/153
(Continued)

FOREIGN PATENT DOCUMENTS

DE 954403 C * 12/1956 ............ F16L 41/023

OTHER PUBLICATIONS

International Search Report and Written Opinion issued by the ISA/US, Commissioner for Patents, dated Sep. 18, 2018, for International Application No. PCT/US2018/039285; 10 pages.
(Continued)

*Primary Examiner* — Atif H Chaudry
(74) *Attorney, Agent, or Firm* — Faegre, Drinker, Biddle & Reath LLP

(57) ABSTRACT

A flow splitter may include an inlet, at least two outlets, and an internal vane comprising a first end corresponding to the inlet and a second end corresponding to the at least two outlets, wherein the internal vane is configured to turn, between the first end and the second end, an internal flowing fluid from 0 degrees to a degree between about 60 degrees and 150 degrees. Methods of dividing fluid flow are also provided.

18 Claims, 6 Drawing Sheets

(51) Int. Cl.
| | |
|---|---|
| *B05D 1/02* | (2006.01) |
| *F25B 39/02* | (2006.01) |
| *F28F 9/02* | (2006.01) |
| *F17D 1/00* | (2006.01) |
| *B01J 8/04* | (2006.01) |
| *B24B 57/02* | (2006.01) |
| *B01J 8/02* | (2006.01) |
| *B01J 8/22* | (2006.01) |

(52) U.S. Cl.
CPC ............. *B05D 1/02* (2013.01); *B24B 57/02* (2013.01); *F15D 1/04* (2013.01); *F15D 1/14* (2013.01); *F17D 1/005* (2013.01); *F25B 39/028* (2013.01); *F28D 3/04* (2013.01); *F28F 9/0275* (2013.01); *Y10T 137/85938* (2015.04)

(58) Field of Classification Search
CPC ......... B05D 1/02; B24B 57/02; F25B 39/028; B01J 8/22; B01J 8/0492; B01J 8/0278; Y10T 137/85938
See application file for complete search history.

(56) References Cited

U.S. PATENT DOCUMENTS

| | | |
|---|---|---|
| 4,611,543 A | 9/1986 | Collette |
| 5,908,047 A | 6/1999 | Nakamura et al. |
| 5,915,354 A | 6/1999 | Ma |
| 6,116,284 A | 9/2000 | Murray et al. |
| 2003/0192339 A1 | 10/2003 | Macbain |
| 2009/0007978 A1 | 1/2009 | Alston et al. |
| 2009/0188461 A1 | 7/2009 | Kummermehr |
| 2011/0241334 A1* | 10/2011 | Kawano ............... F15D 1/04 285/179 |
| 2017/0045153 A1 | 2/2017 | Scheibe |

OTHER PUBLICATIONS

International Preliminary Report on Patentability issued by the IPEA/US, Commissioner for Patents, dated Jul. 19, 2019, for International Application No. PCT/US2018/039285; 14 pages.

* cited by examiner

FLOW DIVIDER WITH INTERNAL VANE

CROSS-REFERENCE TO RELATED APPLICATIONS

The present application is national stage entry of International (PCT) Patent Application Number PCT/US2018/039285, filed Jun. 25, 2018 which in turn claims priority to U.S. Provisional Application No. 62/527,385, filed Jun. 30, 2017, the subject matter of which are expressly incorporated herein by reference.

FIELD OF THE DISCLOSURE

This disclosure relates to flow dividers, including flow dividers for gasses. More specifically, this disclosure relates to flow dividers having an internal vane that accounts for the compression of gasses at a sharp turn.

BACKGROUND

In various applications, fluids and—more specifically gasses—must traverse paths that involve sharp turns and then split into two or more streams of flowing fluid. For example, in engines, fluids or gasses must often rapidly change direction, such as within a fuel delivery system.

In many instances, the flowing gas (e.g., air) must be divided shortly after a sharp turn (e.g. a turn between about 60° and 180°). However, many fluids, such as gasses, are easily compressible. As such, the compressed gas will tend to compress at and shortly after the sharp turn. For example, flowing air in an intake valve in an engine will tend to hug the outside of a 90° bend compressing the air. Thus, dividing the flow of a compressible fluid shortly after a sharp turn can often lead to uneven mass distribution in the divided streams.

While some engines have tried to account for uneven mass distribution by adding a turning vane at the sharp turn, in some situations, such as with large engines operating with low pressure fuel delivery systems, a turning vane cannot be added upstream of the flow splitter. Thus, a need therefore exists to address the issue of more even mass distribution of flow splitters that are placed downstream of a sharp turn.

SUMMARY

In some embodiments, flow splitters may include an inlet, at least two outlets, and an internal vane comprising a first end corresponding to the inlet and a second end corresponding to the at least two outlets, wherein the internal vane is configured to turn, between the first end and the second end, an internal flowing fluid from 0 degrees to a degree between about 60 degrees and 150 degrees. The internal vane may be configured to split the internal flowing fluid along a first axis. In some embodiments, the at least two outlets may split the internal flowing fluid. Further, one of the at least two outlets may have a first axis component and another outlet may have a second axis component. Additionally, the first component and second axis components may define a plane.

In other embodiments, the at least two outlets may also form a right angle on the plane formed from the first axis and the second axis. Thus, in some embodiments the internal vane may be configured to turn the internal flowing fluid between about 80 degrees and 100 degrees, such as by about 90 degrees.

In some embodiments, the internal vane may form a first conduit and a second conduit using the internal vane. In some instances, the first conduit and the second conduit may have equal cross-sectional areas between the first end and the second end. In some examples, the first conduit and the second conduit may have varying cross-sectional areas between the first end and the second end.

In some examples, the average cross-sectional area of the first conduit may be greater than an average cross-sectional area of the second conduit. In some embodiments, the average cross-sectional area of the first conduit may be equal to an average cross-sectional area of the second conduit. The cross-sectional area of the first conduit, the second conduit, or both the first conduit and the second conduit may decrease between the first end and an intermediary location within the internal vane.

In some embodiments, the second vane may turn the internal flowing fluid from 0 degrees to a degree between about 60 degrees and 150 degrees. In some embodiments, the first internal vane and the second internal vane are parallel. In some embodiments, the flow splitter is configured to split the internal flowing fluid so there is a maximum variation of about 30% or less between the volumetric fluid flow between the at least two outlets. The maximum variation may be about 5% or less, or about 2% or less in some embodiments.

Methods of splitting fluid flow may include directing a fluid flow through a sharp turn, directing the fluid flow into an inlet of a flow splitter downstream of the sharp turn, dividing the fluid flow into a first sub-fluid flow and a second sub-fluid flow with an internal vane, wherein the internal vane comprises a first end of the internal vane that is substantially parallel with the fluid flow before directing the fluid flow before the sharp turn, directing the first sub-fluid flow to a first outlet of the flow splitter, and directing the second sub-fluid flow to a second outlet of the flow splitter.

The internal vane may be configured to turn at least one of the first sub-fluid flow or the second sub-fluid flow from 0 degrees to a degree between about 60 degrees and 150 degrees. In some embodiments, the dividing the fluid flow has a maximum volumetric fluid flow variation of about 30% or less.

In some embodiments, the internal vane forms a first cross-sectional area and a second cross-sectional area. The relative size of the cross-sectional areas are not particularly limited and the first cross-sectional area and the second cross-sectional area may be different sizes, such as embodiments where the first cross-sectional are is between about 20% to about 35% larger than the second cross-sectional area. In some embodiments, the size difference between the first cross-sectional area and the second cross-sectional area may cause a pressure differential between the inlet and at least one of the outlets and/or may cause a differential in pressure across at least one of the outlets.

BRIEF DESCRIPTION OF THE DRAWINGS

The above mentioned and other features and objects of this disclosure, and the manner of attaining them, will become more apparent and the disclosure itself will be better understood by reference to the following description of exemplary embodiments of the disclosure taken in conjunction with the accompanying drawings, wherein.

Figure 1:
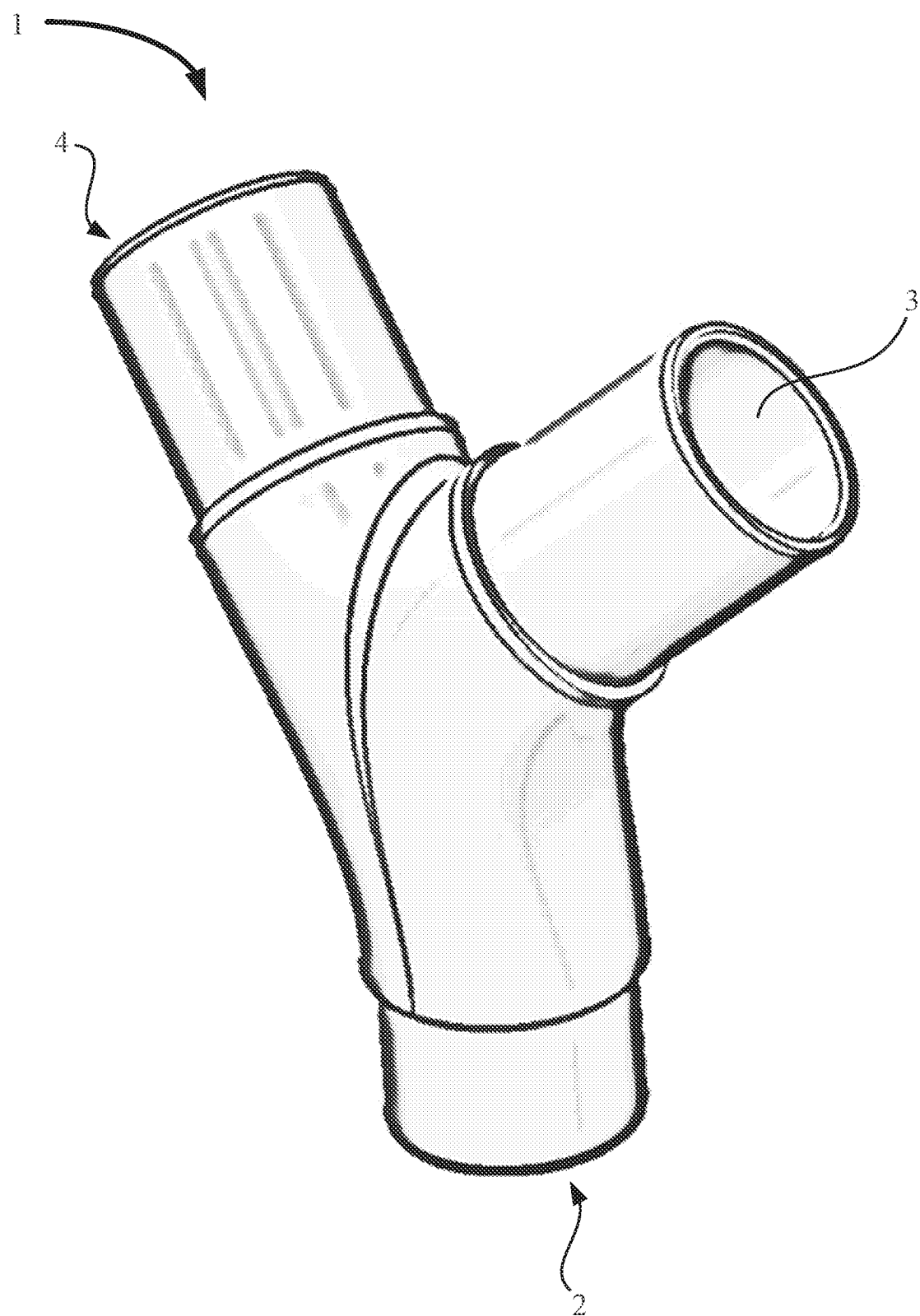
FIG. 1 illustrates a perspective view of a flow-divider.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate exemplary embodiments of the disclosure, in various forms, and such exemplifications are not to be construed as limiting the scope of the disclosure in any manner.

DETAILED DESCRIPTION

The embodiments disclosed below are not intended to be exhaustive or limit the disclosure to the precise form disclosed in the following detailed description. Rather, the embodiments are chosen and described so that others skilled in the art may utilize its teachings.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

Figure 3:
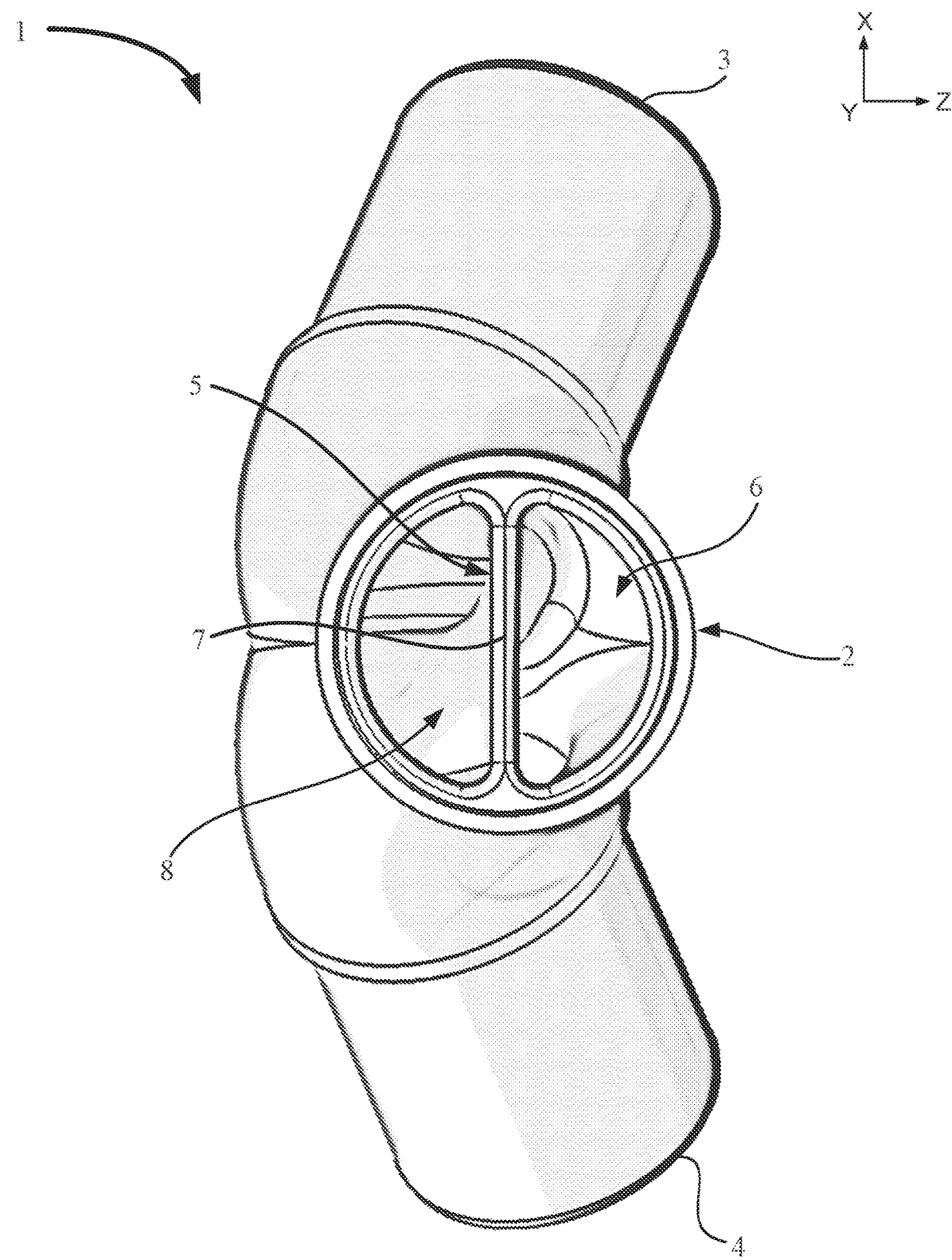
FIG. 3 illustrates a perspective view of a flow-divider looking along the y-axis.

FIG. 1 illustrates a perspective view of a flow-divider (e.g., a flow splitter) according to various embodiments. Flow splitter 1 may include an inlet 2 and at least two outlets, including a first outlet 3 and a second outlet 4. With temporary reference to FIG. 3, the bottom of flow splitter (looking along the Y-axis) is shown. As can be seen in FIG. 3, flow splitter 1 may include an internal vane 5 comprising a first end 7 and a second end 10 (shown in FIG. 4D). The first end 7 may be located near (e.g., at, adjacent, and/or operably coupled) to the inlet 2. Further, the second end 10 may be located near the at least two outlets (e.g., the first outlet 3 and the second outlet 4). As will be described below, the internal vane 5 may be configured to turn, between the first end 7 and the second end 10, an internal flowing fluid from 0 degrees to a degree between about 60 degrees and about 150 degrees.

Figure 2:
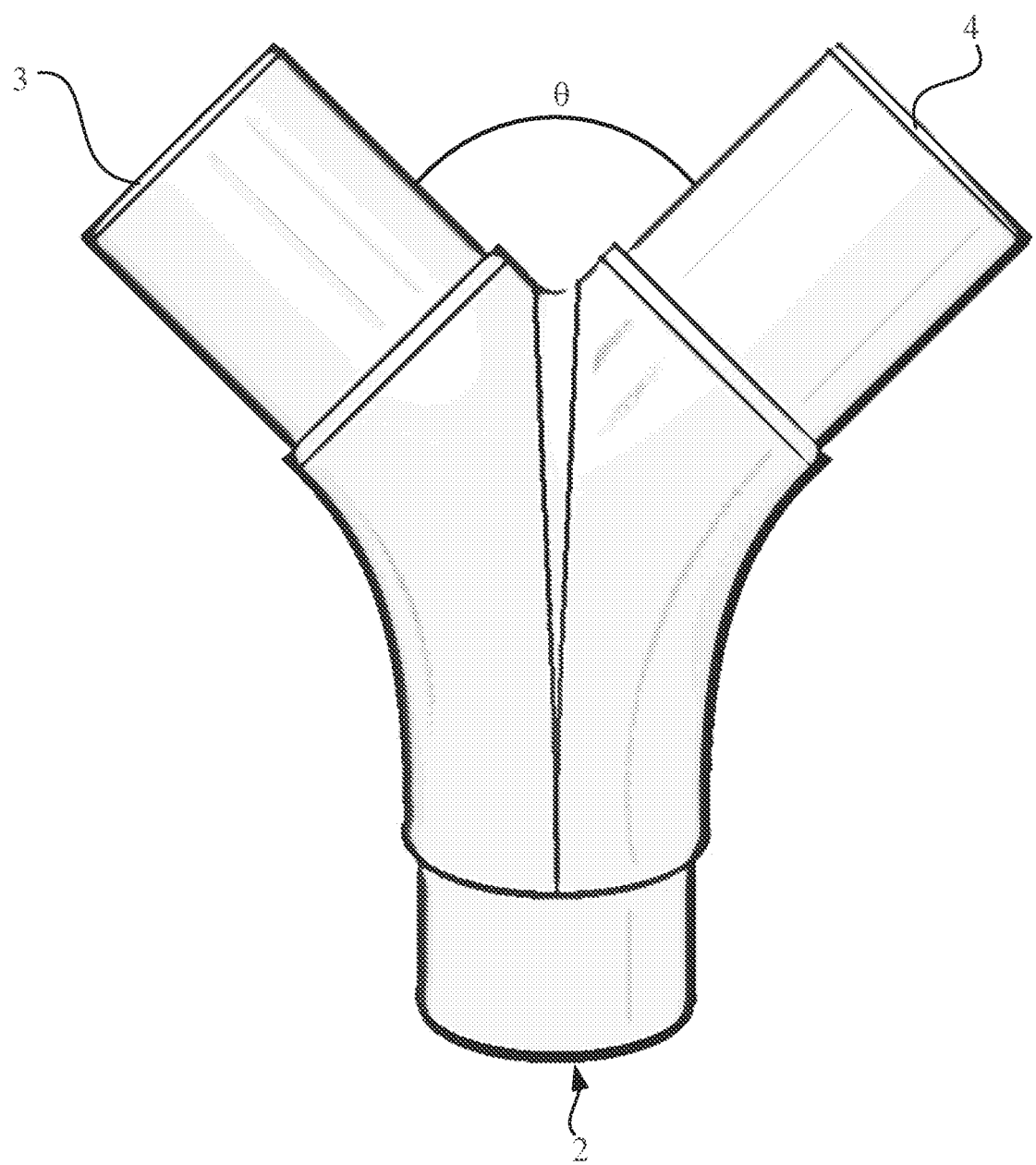
FIG. 2 illustrates a perspective view of a flow-divider looking along the z-axis.

FIG. 2 illustrates another perspective view of flow splitter 1. FIG. 2 helps to illustrate the division between the first outlet 3 and the second outlet 4. As can be seen in FIG. 2, the inlet 2 may be positioned below the first outlet 3 and the second outlet 4 with respect to the Y-axis. Flow splitter 1 may then direct the flow into first outlet 3 and second outlet 4, which have differing directions.

The perspective view of FIG. 3 illustrates how the flow splitter 1 may separate the flow into two differing directions with respect to the X-axis. In some embodiments, initially, the internal vane 5 (e.g., the first end 7 of the internal vane 5) may be parallel with the X-axis and located near the inlet 2. As an internal flowing fluid (e.g., a gas) flows through the flow splitter 1, the internal vane 5 may divide the internal flowing fluid. Thus, with reference to FIG. 4A-4D, the external wall 9 and the internal vane 5 may form a first conduit 6 and a second conduit 8. As the internal vane 5 progresses along the positive Y-axis (e.g., towards the second end 10 located near the at least two outlets 3 and 4), the internal vane 5 may rotate (e.g., rotate around an axis, such as the z axis). For example, initially, at the first end 7 of the internal vane 5, the internal vane 5 may be at 0 degrees corresponding to a plane, such as an x-z axis plane and located on the x axis. As the internal vane 5 progresses from the first end 7 to the second end 10, the internal vane 5 may rotate around the z axis. The rotation may be gradual (e.g., 1 or 2 degrees every few millimeters) or may be more sudden (e.g., 10 or 20 degrees for a few millimeters). At the second end 10 of the internal vane 5 and due to the rotation, the internal vane 5 may be positioned with a degree (e.g., a degree between about 60 degrees to about 150 degrees) corresponding to the same plane (e.g., the x-z axis plane).

In various embodiments, the internal vane 5 may be configured to split the internal flowing fluid along a first axis (e.g., along the X-axis) and then divide the flow between the two outlets, first outlet 3 and second outlet 4. First outlet 3 and second outlet 4 may then split the internal flowing fluid wherein one of the outlets has a first axis component and the another outlet has a second axis component, and the first and second axis components defining a plane.

For example, with temporary reference to FIG. 2, the first axis component and the second axis component of the outlets may form an angle θ in the X-Y plane. In various embodiments, the angle between the first outlet 3 and the second outlet 4 may be an acute angle, may be a right angle, or may be an obtuse angle. FIG. 2 illustrates angle θ as a substantially right angle on a plane formed by the first axis component (X-axis) and a second axis component (Y-axis) that is parallel to the X-Y plane. As discussed above, in some embodiments, the splitting of the internal flowing fluid between the first outlet 3 and the second outlet 4 may be accomplished by the twisting or rotation of the internal vane 5.

Figure 4A:
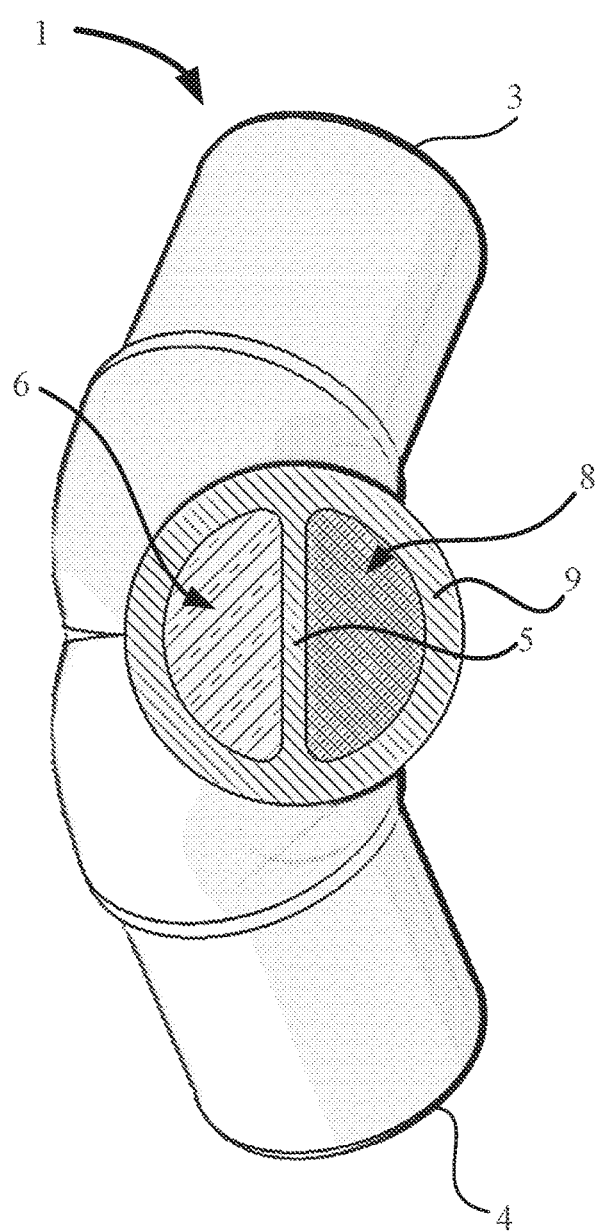
FIGS. 4A, 4B, 4C, and 4D illustrate a cross-sectional views of a flow-divider progressively moving along the y-axis respectively.
Figure 4B:
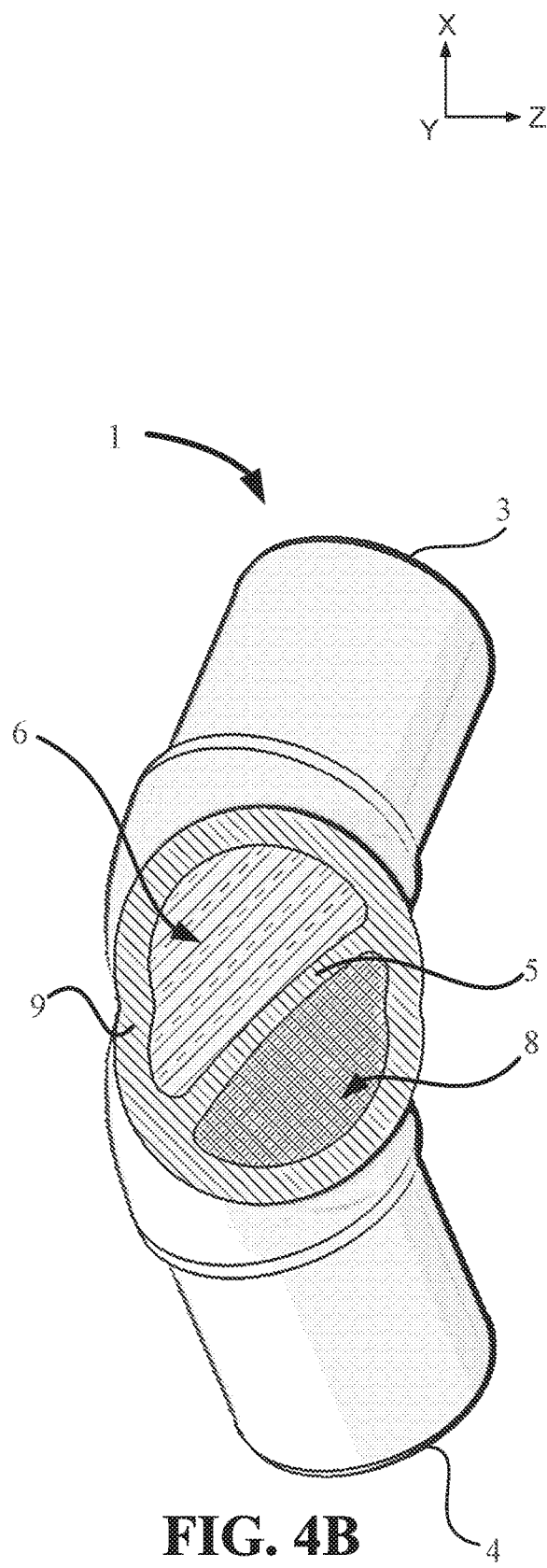
Figures 4C, 4D:
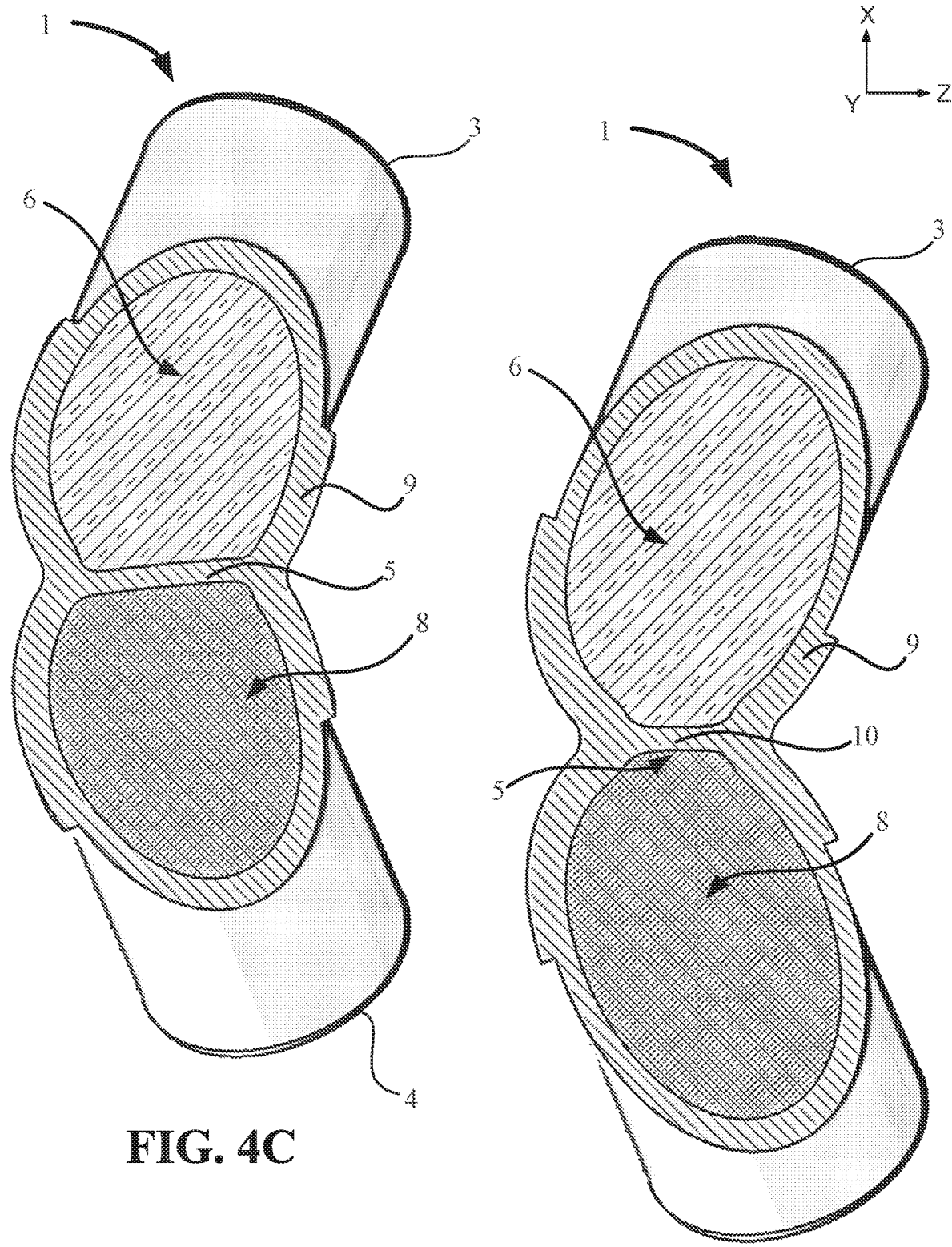

For example, FIGS. 4A-4D illustrate various cross-sectional views along the Y-axis and help to illustrate the rotation of the internal vane 5 from the first end 7 to the second end 10 according to various embodiments. In various embodiments, the internal vane 5 may be configured to turn the internal fluid from 0 degrees to a degree between about 60° to about 150°, such as a degree between about 60° to about 120°, between about 80° to about 100°, or about 90°. For example, FIG. 4A shows a cross-sectional view of the internal vane 5 at the first end 7. Then, FIGS. 4B-4D show the progression of the rotation of the internal vane 5. Further, FIG. 4D shows a cross-sectional view of the internal vane 5 at the second end 10.

In some embodiments, the internal vane 5 may create a first conduit 6 and a second conduit 8 between the internal vane 5 and the outer wall 9 of the flow divider. In various embodiments, the cross-sectional areas of the first conduit 6 and the second conduit 8 may be equal or they may be different. In some embodiments, the cross-sectional areas of the first conduit 6 and the second conduit 8 may vary between the cross-sectional area at different locations of the internal vane 5 (e.g., the first end 7 of the internal vane 5 (shown in FIG. 4A) may have a different cross-sectional area from the locations of the internal vane 5 (shown in FIGS. 4B-4D)).

In various embodiments, an average cross-sectional area of the first conduit 6 may be equal to or different than an average cross-sectional area of the second conduit 8. For example in some embodiments, the average cross-sectional area of the first conduit 6 may be greater than an average cross-sectional area of the second conduit 8. The variation is not particularly limited and may be up to about 10% greater, up to about 5% greater, up to about 3% greater, or up to about 1% greater.

In some embodiments, the cross-sectional area of the first conduit 6, the second conduit 8, or both the first conduit 6 and the second conduit 8 may decrease between the first end 7, an intermediary position located within the internal vane 5, and the second end 10. Without being limited to any theory, it is believed that the variation of the size of the cross-sectional areas of either the first conduit 6, the second conduit 8, or both, may be used to advantageously effect pressure, flow velocity, or both. In some embodiments, the first cross-sectional area may be between about 20% to about 35% larger than the second cross-sectional area, between about 20% and about 30% larger than the second cross-sectional area, or about 28% larger than the second cross-sectional area. In various embodiments, the size difference between the first cross-sectional area and the second cross-sectional area cause a pressure drop between the inlet 2 and at least one of the outlets 3, 4.

While the FIGS. 1-5 have provided embodiments comprising one internal vane, a person of ordinary skill in the art with the benefit of this disclosure will recognize that a plurality of vanes may be used. For example, in some embodiments, more internal vanes may be added to divert flow to more than two outlets. In various embodiments, a second vane may be added. The second vane may be configured to turn, between a first end of the second vane and a second end of the second vane, the internal flowing fluid between about 60 degrees and 150 degrees. In various embodiments, the internal vanes may be parallel or in series. In other embodiments only the first ends of the internal vanes may be parallel or in series.

Figure 5:
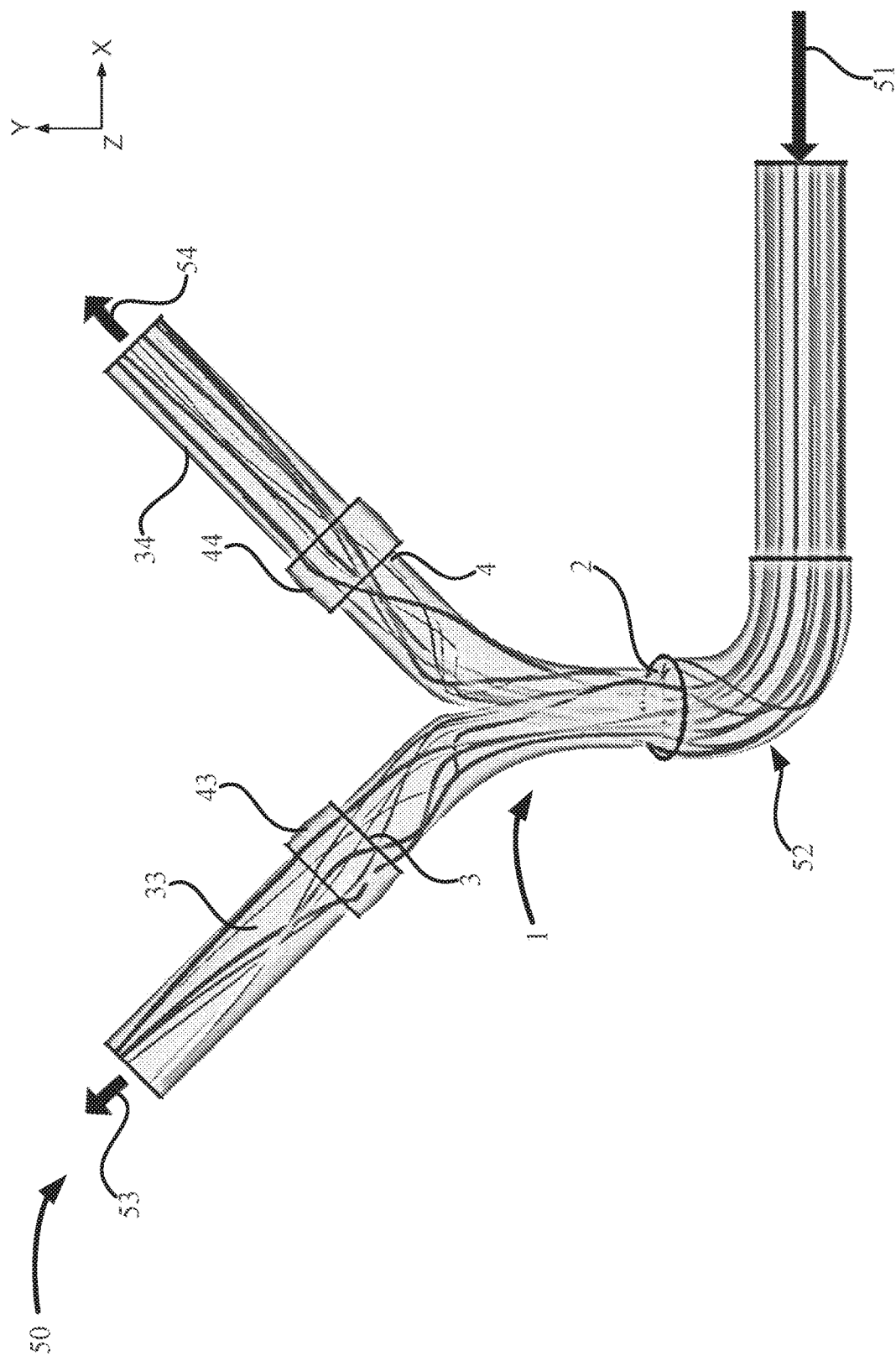
FIG. 5 is a diagram of gas flow in a flow-divider after a sharp turn.

FIG. 5 is a diagram of data taken from an exemplary flow splitter 1. Exemplary flow circuit 50 may include a sharp turn 52 fluidly coupled to v. FIG. 5 illustrates initial gas flow 51 flowing along the X-axis. After entering the sharp turn 52, the gas flows to flow divider 1. The flow was evenly directed to first outlet 3 and second outlet 4 and to first downstream flow circuit 33 and second downstream circuit 34, which were coupled to first outlet 3 and second outlet 4, respectively, with first coupler 43 and second coupler 44. Thus, flow divider was able to evenly redirect initial gas flow 51 after a sharp turn 52 into first flow direction 53 and second flow direction 54.

The mass flow data illustrated was also measured and then compared with a conventional flow divider without an internal vane. The flow dividers were connected to an engine that was operated at an initial flow rate and a maximum flow rate. The ratio of the first outlet and the second outlet were then compared.

TABLE 1

| Divider | Mass Flow Ratio (Mass Flow of Second Outlet/Mass Flow of First Outlet) | |
| --- | --- | --- |
|  | Flow Rate A | Flow Rate B |
| Conventional Flow Divider Without Internal Vane | 0.726 | 0.585 |
| Flow Divider With Internal Vane | 0.995 | 1.02 |

Thus, as can be seen in Table 1, the incorporation of an internal vane resulted in a significant improvement in equally dividing the mass flow to the two outlets of the mass flow divider.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A flow splitter comprising:
an inlet receiving a fluid flow flowing along a first axis;
at least two outlets, one outlet receiving a first portion of the fluid flow, and another outlet receiving a second portion of the fluid flow; and
an internal vane comprising a first end corresponding to the inlet and a second end corresponding to the at least two outlets, wherein the internal vane forms a first conduit having a first cross-sectional area and a second conduit having a second cross-sectional area using the internal vane and is configured to turn the fluid flow about the first axis from 0 degrees at the first end to a degree between about 60 degrees and 150 degrees at the second end;

wherein an average cross-sectional area of the first conduit is greater than an average cross-sectional area of the second conduit such that the first cross-sectional area and the second cross-sectional area are different sizes; and wherein the size difference between the first cross-sectional area and the second cross-sectional area causes a pressure differential between the at least two outlets.

2. The flow splitter of claim 1, wherein the internal vane is configured to split the internal flowing fluid along a first axis, wherein the at least two outlets split the internal flowing fluid,
one of the at least two outlets having a first axis component and another outlet having a second axis component, and
the first and second axis components defining a plane.

3. The flow splitter of claim 2, wherein the first axis component and a second axis component of the at least two outlets form an acute angle.

4. The flow splitter of claim 2, wherein the first axis component and a second axis component of the at least two outlets form a right angle.

5. The flow splitter of claim 1, wherein the internal vane is configured to turn the internal flowing fluid between about 80 degrees and 100 degrees.

6. The flow splitter of claim 1, wherein the internal vane is configured to turn the internal flowing fluid by about 90 degrees.

7. The flow splitter of claim 6, wherein the first conduit and the second conduit have varying cross-sectional areas between the first end and the second end.

8. The flow splitter of claim 6, wherein a cross-sectional area of either the first conduit, the second conduit, or both the first conduit and the second conduit decreases between the first end and an intermediary location within the internal vane.

9. The flow splitter of claim 1, further comprising a second vane configured to turn the internal flowing fluid from 0 degrees to a degree between about 60 degrees and 150 degrees.

10. The flow splitter of claim 9, wherein the internal vane and the second internal vane are parallel.

11. The flow splitter of claim 1, wherein the flow splitter is configured to split the internal flowing fluid so there is a maximum variation of about 30% or less between the volumetric fluid flow between the at least two outlets.

12. The flow splitter of claim 11, wherein the maximum variation is about 5% or less.

13. The flow splitter of claim 12, wherein the maximum variation is about 2% or less.

14. The flow splitter of claim 1, wherein the first cross-sectional area is between about 20% to about 35% larger than the second cross-sectional area.

15. The flow splitter of claim 1, wherein the size difference between the first cross-sectional area and the second cross-sectional area causes a pressure drop between the inlet and at least one of the outlets.

16. A method of splitting fluid flow comprising:
directing a fluid flow through a sharp turn;
directing the fluid flow into an inlet of a flow splitter downstream of the sharp turn;
dividing the fluid flow with an internal vane into a first sub-fluid flow through a first conduit having a first cross-sectional area and a second sub-fluid flow through a second conduit having a second cross-sectional area, wherein the internal vane comprises a first end of the internal vane that is substantially parallel with the fluid flow before directing the fluid flow through the sharp turn;
directing the first sub-fluid flow to a first outlet of the flow splitter; and
directing the second sub-fluid flow to a second outlet of the flow splitter;
wherein an average cross-sectional area of the first conduit is greater than an average cross-sectional area of the second conduit such that the first cross-sectional area and the second cross-sectional area are different sizes; and
wherein the first cross-sectional area is between about 20% to about 35% larger than the second cross-sectional area.

17. The method of claim 16, wherein the internal vane is configured to turn at least one of the first sub-fluid flow or the second sub-fluid flow from 0 degrees to a degree between about 60 degrees and 150 degrees.

18. The method of claim 16, wherein the dividing the fluid flow has a maximum volumetric fluid flow variation of about 30% or less.

* * * * *